United States Patent
Hong et al.

(10) Patent No.: US 11,184,514 B2
(45) Date of Patent: Nov. 23, 2021

(54) PAN MOTION CAMERA PREVENTING DIFFUSE REFLECTION OF ILLUMINATION LIGHT

(71) Applicant: HANWHA TECHWIN CO., LTD., Seongnam-si (KR)

(72) Inventors: Kil Hwa Hong, Seongnam-si (KR); Dae Kyung Kim, Seongnam-si (KR); Byung Moon Jun, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 16/891,057

(22) Filed: Jun. 3, 2020

(65) Prior Publication Data
US 2021/0281728 A1    Sep. 9, 2021

(30) Foreign Application Priority Data

Mar. 6, 2020    (KR) ........................ 10-2020-0028269

(51) Int. Cl.
*H04N 5/225* (2006.01)
*H04N 5/232* (2006.01)

(52) U.S. Cl.
CPC ......... *H04N 5/2256* (2013.01); *H04N 5/2252* (2013.01); *H04N 5/2253* (2013.01); *H04N 5/23299* (2018.08)

(58) Field of Classification Search
CPC ............. H04N 5/2256; H04N 5/23299; H04N 5/2252; H04N 5/2253
See application file for complete search history.

(56) References Cited

U.S. PATENT DOCUMENTS

| | | | | |
|---|---|---|---|---|
| 10,223,885 | B2* | 3/2019 | Larsson | H04N 5/332 |
| 10,587,785 | B2* | 3/2020 | Kawashima | H04N 5/2256 |
| 2016/0185354 | A1* | 6/2016 | Lisseman | H04N 5/2252 |
| | | | | 701/36 |
| 2017/0111554 | A1* | 4/2017 | Wada | H04N 7/183 |
| 2017/0331987 | A1* | 11/2017 | Kimura | G08B 13/19619 |
| 2018/0017847 | A1* | 1/2018 | Tamaru | G03B 17/02 |
| 2018/0024416 | A1* | 1/2018 | Kishine | H04N 5/225 |
| | | | | 359/614 |
| 2020/0084347 | A1* | 3/2020 | Kimura | H04N 5/232 |

FOREIGN PATENT DOCUMENTS

JP        2017-208804        11/2017

* cited by examiner

*Primary Examiner* — Amy R Hsu
(74) *Attorney, Agent, or Firm* — Sughrue Mion, PLLC

(57) ABSTRACT

A pan motion camera including a motor providing a rotational driving force; a rotating member rotating around a rotation axis according to the rotation driving force; at least one camera module mounted on the rotating member and rotating together with the rotating member; at least one lighting module mounted on a position corresponding to the at least one camera module on the rotating member and rotating together without movement relative to the at least one camera module; and a light blocking member fixed to a side of a camera housing and blocking light emitted from the lighting module from flowing into a lens of the camera module without contacting the rotating member.

20 Claims, 10 Drawing Sheets

100

100

PAN MOTION CAMERA PREVENTING DIFFUSE REFLECTION OF ILLUMINATION LIGHT

CROSS-REFERENCE TO RELATED APPLICATION

This application claims priority from and the benefit of Korean Patent Application No. 10-2020-0028269 filed on Mar. 6, 2020, which is hereby incorporated by reference for all purposes as if fully set forth herein.

BACKGROUND

Field

Exemplary embodiments/implementations of the invention relate generally to a pan motion camera preventing diffuse reflection of illumination light, and more specifically, to a structure that blocks diffuse reflection light that is diffusely reflected from lighting modules that rotate together with a camera module in a pan motion camera and flows into the camera module.

Discussion of the Background

Generally, a surveillance camera incorporates a dome cover that protects a camera module and a lighting module to provide illumination light to enable shooting in the dark.

In one mode of operation, the camera module and lighting module rotate together to capture a wide range of pictures or images. However, when the camera module and the lighting module rotate together in a PTZ (pan-tilt-zoom) camera or a PTRZ (pan-tilt-rotation-zoom) camera with panning motion, diffuse reflection is generated by light emitted from the lighting module. Particularly, when an infrared LED is used as illumination light in an infrared camera, the diffuse reflection problem may be increased. Due to this problem, it is common to use a fixed infrared LED as lighting in a conventional PTZ camera or PTRZ camera. Generally, the PTZ camera is a camera that provides pan, tilt, and zoom functions. The PTRZ camera refers to a camera that further adds an ability to adjust a phase of a photographed image by self-rotating around its optical axis.

However, due to the characteristics of the PTZ camera or the PTRZ camera, if the lighting module is fixed when shooting while the camera module rotates automatically, an angle of view photographed by the camera module deviates from an irradiation angle of the lighting module in a certain location, and thus, the captured image may appear dark.

It would be advantageous to arrange the lighting module of the PTZ camera or PTRZ camera to be rotated (panned) in a manner similar to the camera module rather than fixedly arranged as described above. However, because adjacently placed lighting modules rotate with the camera module, diffuse reflection of illumination light as described above occurs. Moreover, it is also difficult to completely isolate the camera module from the lighting module The above information disclosed in this Background section is only for understanding of the background of the inventive concepts, and, therefore, it may contain information that does not constitute prior art.

SUMMARY

Exemplary embodiments of the invention provide a light blocking structure that fundamentally blocks light emitted from a lighting module from flowing into a camera module, in a pan motion camera in which the camera module and the lighting module rotate together.

Exemplary embodiments also provide a light blocking structure that blocks the inflow of light to prevent interference with a rotating member including the camera module and the lighting module.

Embodiments of the present invention are not restricted to those set forth herein. The above and other features and utilities of the present invention will become more apparent to one of ordinary skill in the art to which the present invention pertains by referencing the detailed description of the present invention given below.

An exemplary embodiment of the invention provides a pan motion camera, including: a motor providing a rotational driving force; a rotating member rotating around a rotation axis according to the rotation driving force; at least one camera module mounted on the rotating member and rotating together with the rotating member; at least one lighting module mounted on a position corresponding to the at least one camera module on the rotating member and rotating together without movement relative to the at least one camera module; and a light blocking member fixed to a side of a camera housing and blocking light emitted from the lighting module from flowing into a lens of the camera module without contacting the rotating member.

The position corresponding to the at least one camera module on which the at least one lighting module is mounted may be a position lower than the camera module and outward in a rotational radial direction.

The at least one camera module may include a plurality of camera modules, and wherein the at least one lighting module includes a plurality of lighting modules corresponding to the plurality of camera modules.

The camera housing may include a light-transmitting cover surrounding the at least one camera module in a dome shape along a circumferential direction; a lighting cover connected to a lower end of the light-transmitting cover and surrounding the at least one lighting module along the circumferential direction; and a case connected to a lower end of the lighting cover and accommodating the motor and the rotating member.

A step may be arranged in the rotational radial direction between the light-transmitting cover and the lighting cover, the step being formed of a material that does not transmit the light.

An end of the step in the rotational radial direction may cover at least a portion of an upper end of the lighting cover so that the light emitted from the at least one lighting module is not irradiated upward to the light-transmitting cover side.

The light blocking member may be fixed to an inner lower portion of the step, and protrudes downward along the circumferential direction, such that first light emitted upward from the lighting module or second light emitted from the lighting module and then reflected upward from the lighting cover is blocked from flowing into the at least one camera module.

The rotating member may include a protrusion projecting upward along at least a portion of the circumferential direction, and the protrusion may be arranged to overlap the light blocking member in the rotational radial direction without contacting the light blocking member so that the first light or the second light does not flow into the at least one camera module.

The protrusion may include a pair of upward ribs, and the pair of upward ribs may be arranged to be spaced apart in the rotational radial direction so that the light blocking member is fitted within the pair of upward ribs without contact.

The rotating member may further include a blocking wall positioned between the pair of upward ribs and the at least one camera module in the rotational radial direction to further block the first light or the second light.

The rotating member may include a downward bent portion bent downward from an end of the rotating member in the rotational radial direction, wherein the downward bent portion blocks third light emitted from the lighting module or fourth light emitted from the lighting module and then reflected downward from the lighting cover from flowing into the at least one camera module.

According to the exemplary pan motion camera with a camera module and a light module rotating together on a rotating member in accordance with the present invention, it is possible to prevent interference with the movement of the rotating member while structurally blocking light emitted from the lighting module from flowing into the camera module.

In addition, according to the exemplary pan motion camera, it is possible to comprehensively block the inflow of illumination light diffusely reflected through various paths, such as inside or outside of the pan motion camera, from the lighting module to the camera module which may interfere with camera operation.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The above and other aspects and features of the present invention will become more apparent by describing in detail exemplary embodiments thereof with reference to the attached drawings.

DETAILED DESCRIPTION

Figure 1A:
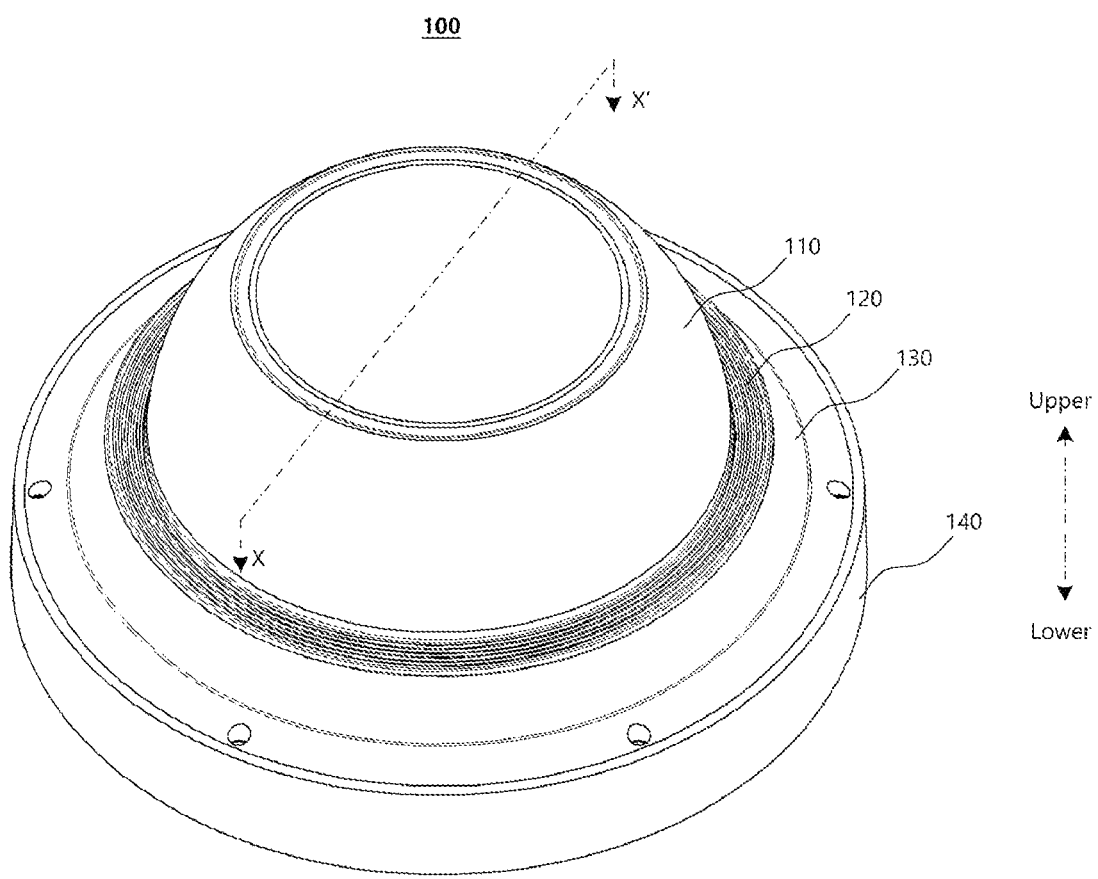
FIG. 1A is a perspective view illustrating a pan motion camera according to an embodiment of the present invention.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided to make the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are to illustrate the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Exemplary embodiments include mechanically isolating a camera module and a lighting module in a structure in which the camera module and the lighting module, which are arranged close to each other in a pan motion camera, rotate together. As described herein, the pan motion camera is a concept encompassing all types of cameras that support pan motion, as well as cameras of the same type as the PTZ camera or PTRZ camera described above.

Figure 1B:
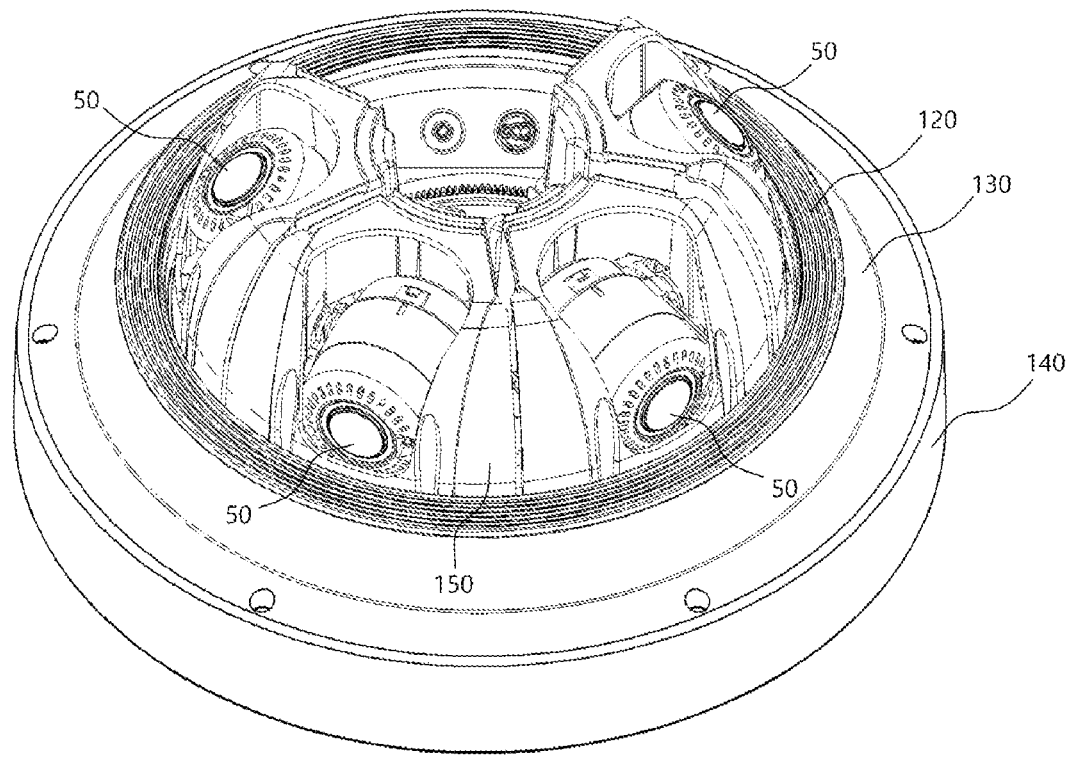
FIG. 1B is a perspective view illustrating in which a light-transmitting cover is removed in accordance with FIG. 1A.

FIG. 1A is a perspective view illustrating a pan motion camera 100 according to an embodiment of the present invention; FIG. 1B is a perspective view of the pan motion camera 100 in which a light-transmitting cover 110 has been removed from FIG. 1A; and FIG. 1C is a perspective view illustrating a rotating assembly 160 with all camera housings removed.

Figure 1C:
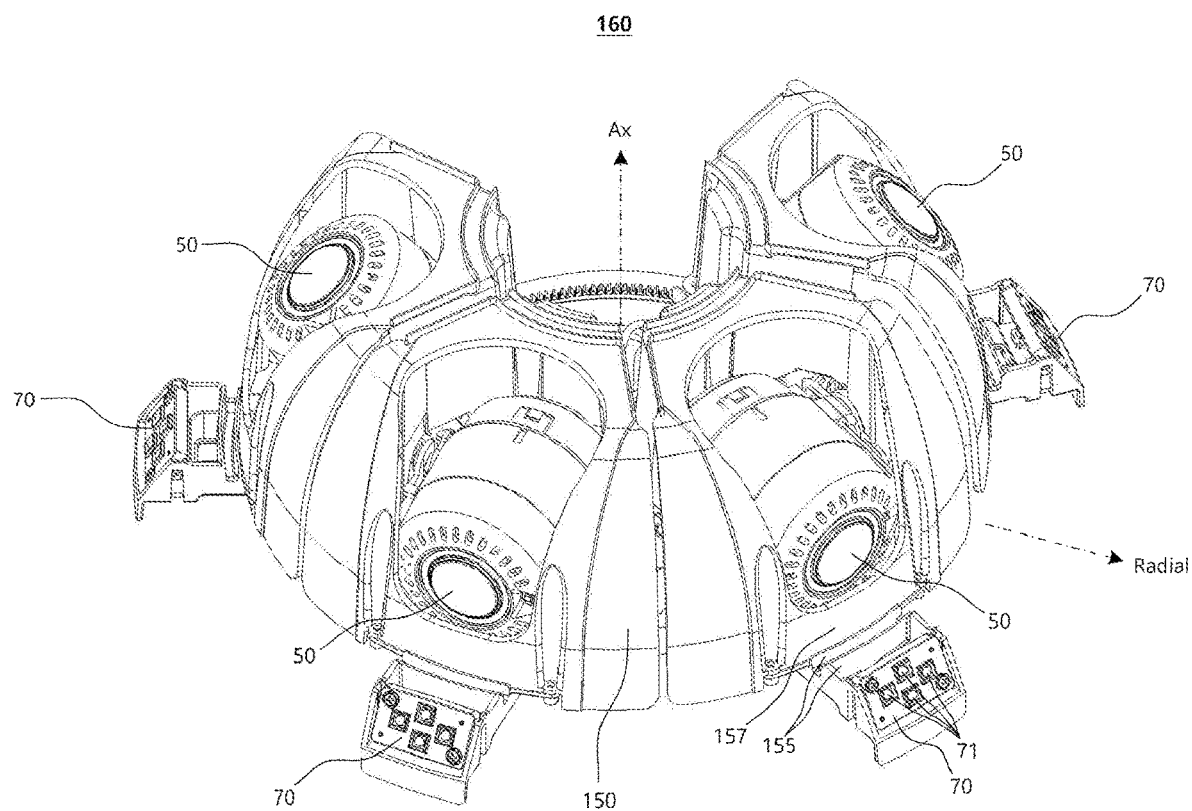
FIG. 1C is a perspective view illustrating a rotating assembly with all camera housings removed in accordance with embodiments disclosed herein.

As illustrated in FIG. 1C, the rotating assembly 160 includes a rotating member 150 that rotates around a rotation axis Ax in response to a driving force of a motor. The rotating assembly 160 includes at least one camera module 50 distributed around a circumference of the rotating member 150, and at least one lighting module 70 mounted to the rotating member 150 corresponding to each camera module 150. Therefore, the at least one camera module 50 are configured to rotate when the rotating member 150 rotates. The at least one lighting module 70 is mounted on the rotating member 150 and in a proximal position to the camera module 50, thereby rotating together with the camera module 50 and not deviating from the proximal position to the camera module 50.

The pan motion camera 100 according to exemplary embodiments includes the camera module 50 and a corresponding number of lighting modules 70, but the number is not limited. For convenience of description, a plurality of camera modules 50 and the same number of lighting modules 70 will be illustrated and described as examples. Particularly, FIGS. 1A to 1C illustrate a case in which four camera modules 50 and four lighting modules 70 are arranged in a circumferential direction. In addition, the pan motion camera 100 has a pan motion rotating at least with respect to a longitudinal axis Ax. Pan may be short for panoramic. A panoramic or pan motion camera may be one that is able to take pictures or videos in wide sweeping shots, up to three hundred sixty degrees and beyond. Pan may also mean to swing (a video or movie camera) in a horizontal or vertical plane, typically to give a panoramic effect or follow a subject. According to exemplary embodiments, pan motion does not exclude the addition of a tilt motion, a self-rotating motion, or a zooming function. For example, the pan motion camera 100 may be a PTRZ camera having a tilt motion in which each camera module 50 is tilted up and down, a self-rotating motion in which each camera module 50 rotates with respect to an optical axis (axis perpendicular to each lens), and a zooming function to enlarge/reduce a captured image.

As illustrated in FIG. 1A, the pan motion camera 100 may include a camera housing configured to accommodate the camera module 50, the lighting module 70, a motor, and other members including a light-transmitting cover 110, a lighting cover 130, and a case 140. In addition, in the following description of the present invention, in the sense of determining a reference direction, it may be assumed that a side on which the light-transmitting cover 100 is positioned is upward and a side on which the case is positioned is downward, but these are relative terms depending on how the pan motion camera is mounted. Naturally, in fact, when the pan motion camera 100 is installed on a ceiling or the like, the direction described above may be reversed. Because this is a relative concept that depends on an installation position, the present invention will be described consistently based on the direction illustrated in FIG. 1A.

Referring to FIGS. 1A and 1B, the camera housing includes the light-transmitting cover 110 surrounding the plurality of camera modules 50 along the circumferential direction, the lighting cover 130 connected to a lower end of the light-transmitting cover 100 and surrounding the plurality of lighting modules 50 along the circumferential direction, and the case 140 connected to a lower end of the lighting cover 130 and accommodating a driving motor (not illustrated) and the rotating assembly 160. The light-transmitting cover 110 may be formed in a flat dome shape or a curved dome shape as illustrated in FIG. 1A.

As illustrated in FIG. 1C, the plurality of lighting modules 70 are arranged corresponding to the plurality of camera modules 50, and are arranged close to each camera module 50 so that light emitted from each lighting module 70 may sufficiently light a subject captured through the camera module 50. Each lighting module 70 includes at least one light source 71 (four light sources in FIG. 1C) that actually emit illumination light.

According to exemplary embodiments, the camera module 50 may be an infrared camera, and the light sources 71 may be infrared light-emitting diodes (LED). However, the inventive concepts are not limited thereto. A visible light camera and a combination of camera/light sources using a visible light source or other wavelength may also be used. In this context, it may be understood that the light-transmitting cover 110 and the lighting cover 130 are covers that receive or emit light of a wavelength band specified according to a designer's intention.

In addition, as illustrated in FIG. 1C, the lighting module 70 is positioned below the camera module 50 and outside the camera module 50 in a rotational radial direction. Therefore, the corresponding lighting cover 130 that surrounds the camera modules 150 is also positioned below and outside of the light-transmitting cover 110 in the rotational radial direction. A step 120 (not illustrated in FIG. 1C) is interposed between the two covers 110 and 130. The step 120 may be used to physically separate the light-transmitting cover 110 and the lighting cover 130. The light-transmitting cover 110 may be one through which light of the subject flows into the camera module 50. The lighting cover 130 may be a cover through which light generated from the lighting module 70 is emitted to the outside. The step 120 is formed extending from a lower end of the light-transmitting cover 110 toward an upper end of the lighting cover 130 in the rotational radial direction, and it is formed of a material that blocks illumination light emitted from the lighting module 70 from being directed to the light-transmitting cover 110. The step 120 may be made of a material such as metal or plastic that has a certain degree of rigidity and prevents light transmission.

Figure 2A:
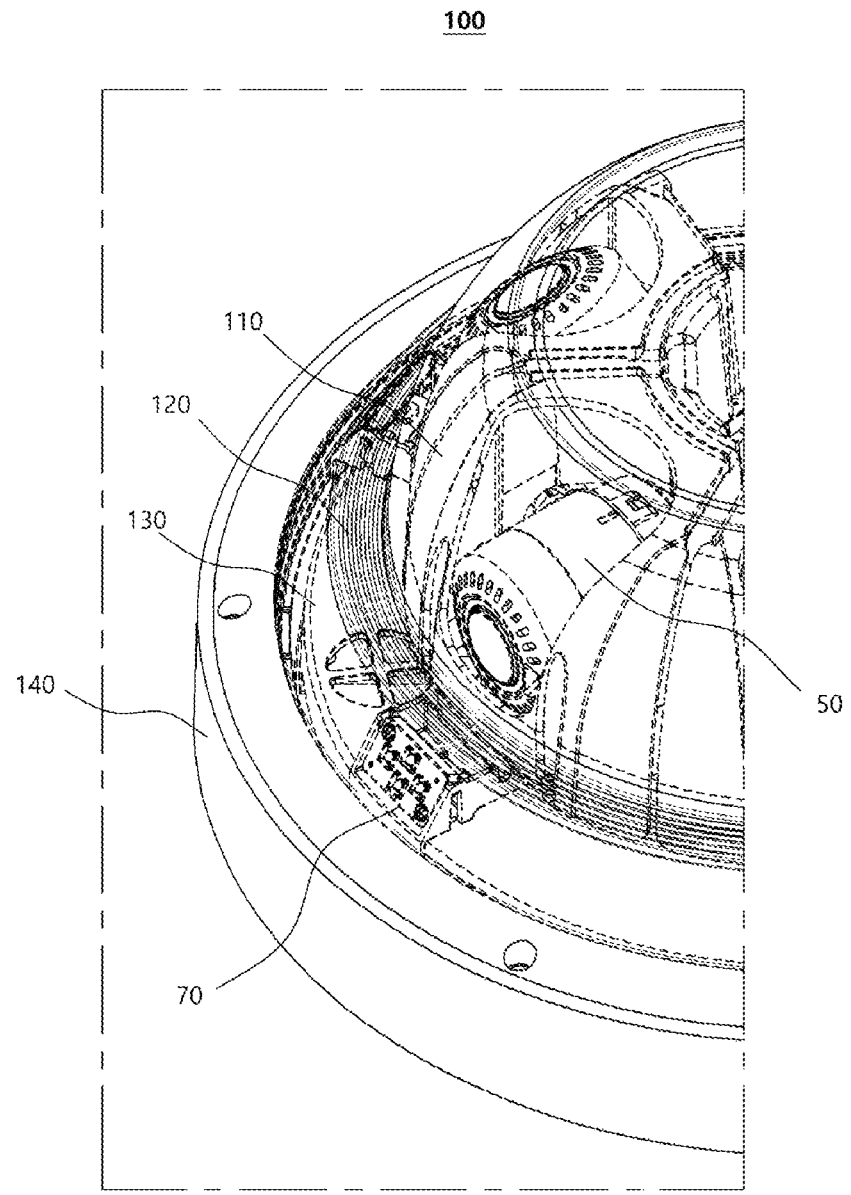
FIG. 2A is a transparent perspective view illustrating the pan motion camera 100 illustrating a camera module and a lighting module arranged in a light-transmitting cover and a lighting cover.
Figure 2B:
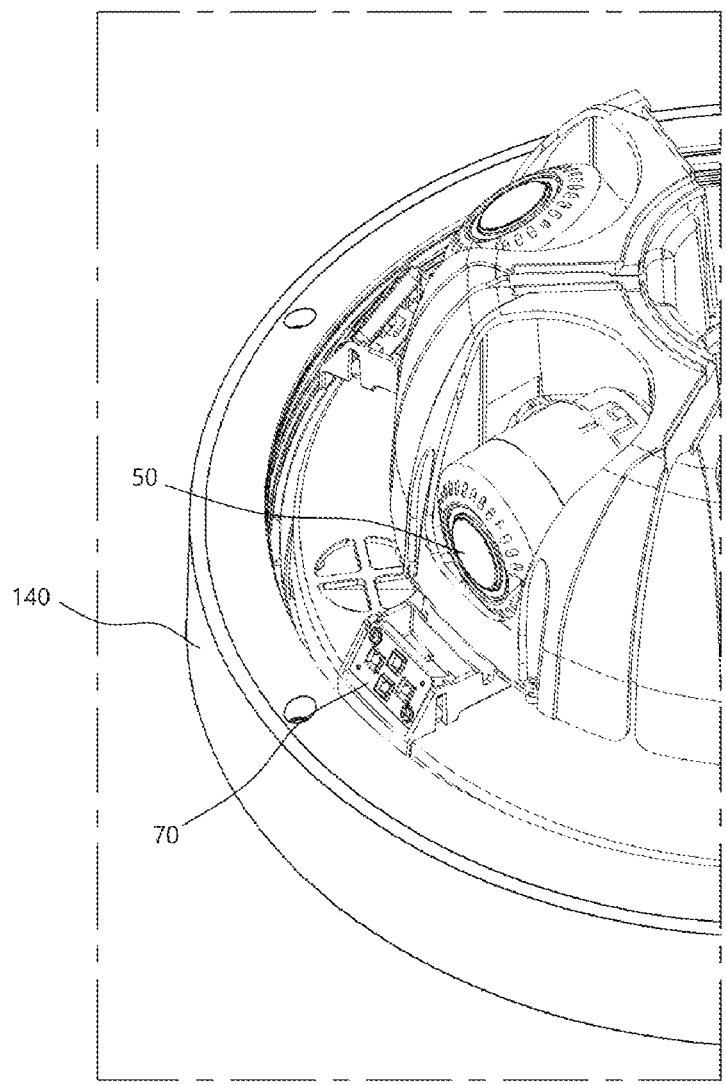
FIG. 2B is a perspective view illustrating the light-transmitting cover and the lighting cover removed in accordance with FIG. 2A.

FIG. 2A is a transparent perspective view of the pan motion camera 100 illustrating the camera module 50 and the lighting module 70 arranged under the light-transmitting cover 110 and the lighting cover 130. FIG. 2B is a perspective view of FIG. 2A with the covers 110 and 130 removed. When illumination light emitted from the lighting module 70 is irradiated outside of the housing through the lighting cover 130, the illumination light is reflected from the subject being illuminated and flows into the camera module 50 through the light-transmitting cover 110. As described above, because the lighting module 70 rotates adjacent to the camera module 50, it ensures synchronization between lighting and a camera. At the same time, as described herein the step 120 may prevent a problem of light being irradiated to the outside of the lighting cover 130 and directly flowing into the light-transmitting cover 110 and hence the cameras 50

However, the lighting cover 130 does not completely transmit the illumination light emitted from the lighting module 70. Therefore, some light is reflected back inside. Because the lighting module 70 is arranged close to the camera module 50, an image of a subject cannot be properly photographed if the illumination light reflected from the lighting module 70 flows into a lens of the camera module 50 through a path inside the camera housing. This is true even when a small amount of light is reflected. Therefore, exemplary embodiments described herein include a structure that fundamentally blocks illumination light reflected inside the camera housing from flowing into the camera module 50.

Figure 3A:
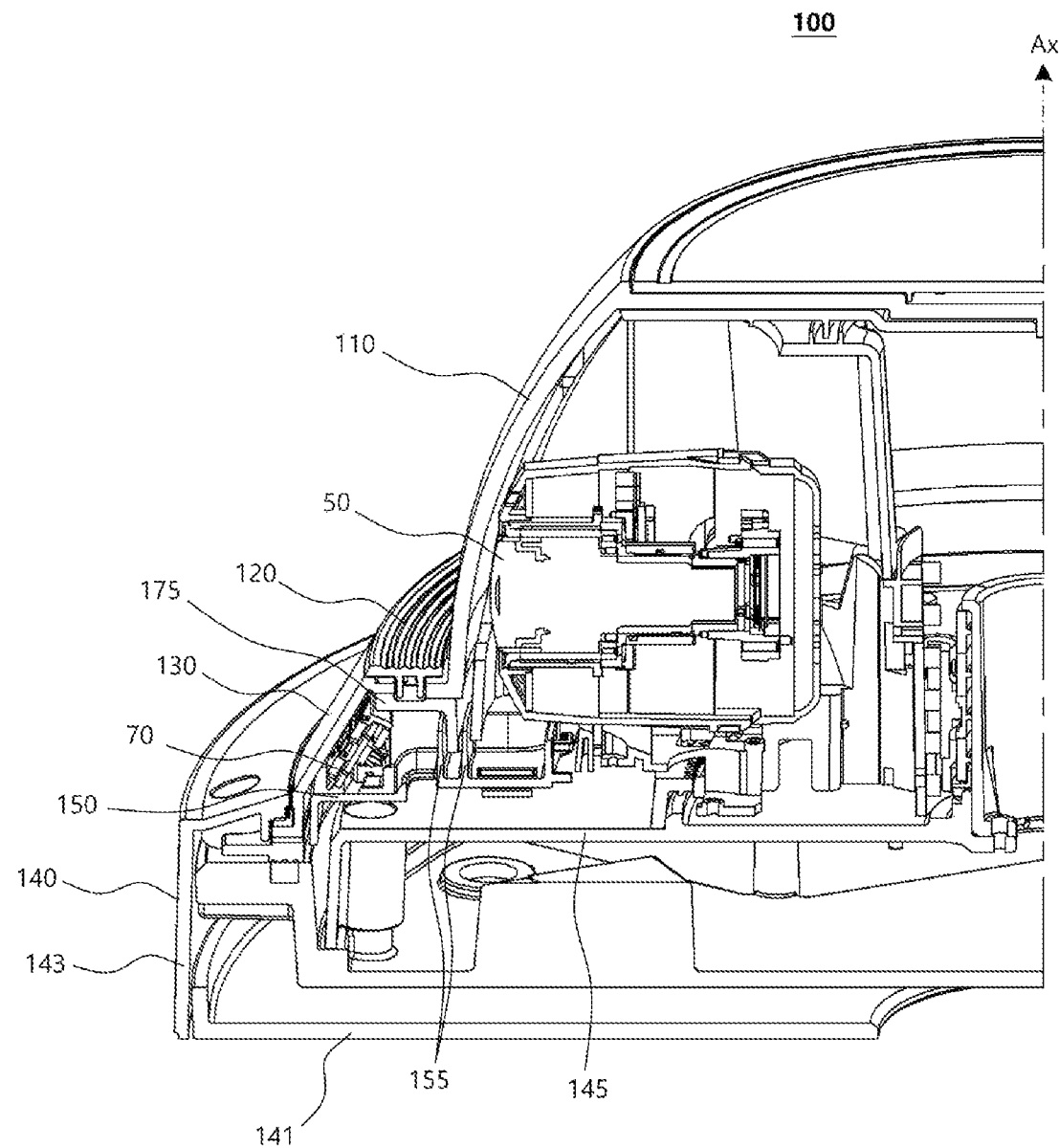
FIG. 3A is a cut perspective view illustrating the pan motion camera of FIG. 1A in an X-X' direction.
Figure 3B:
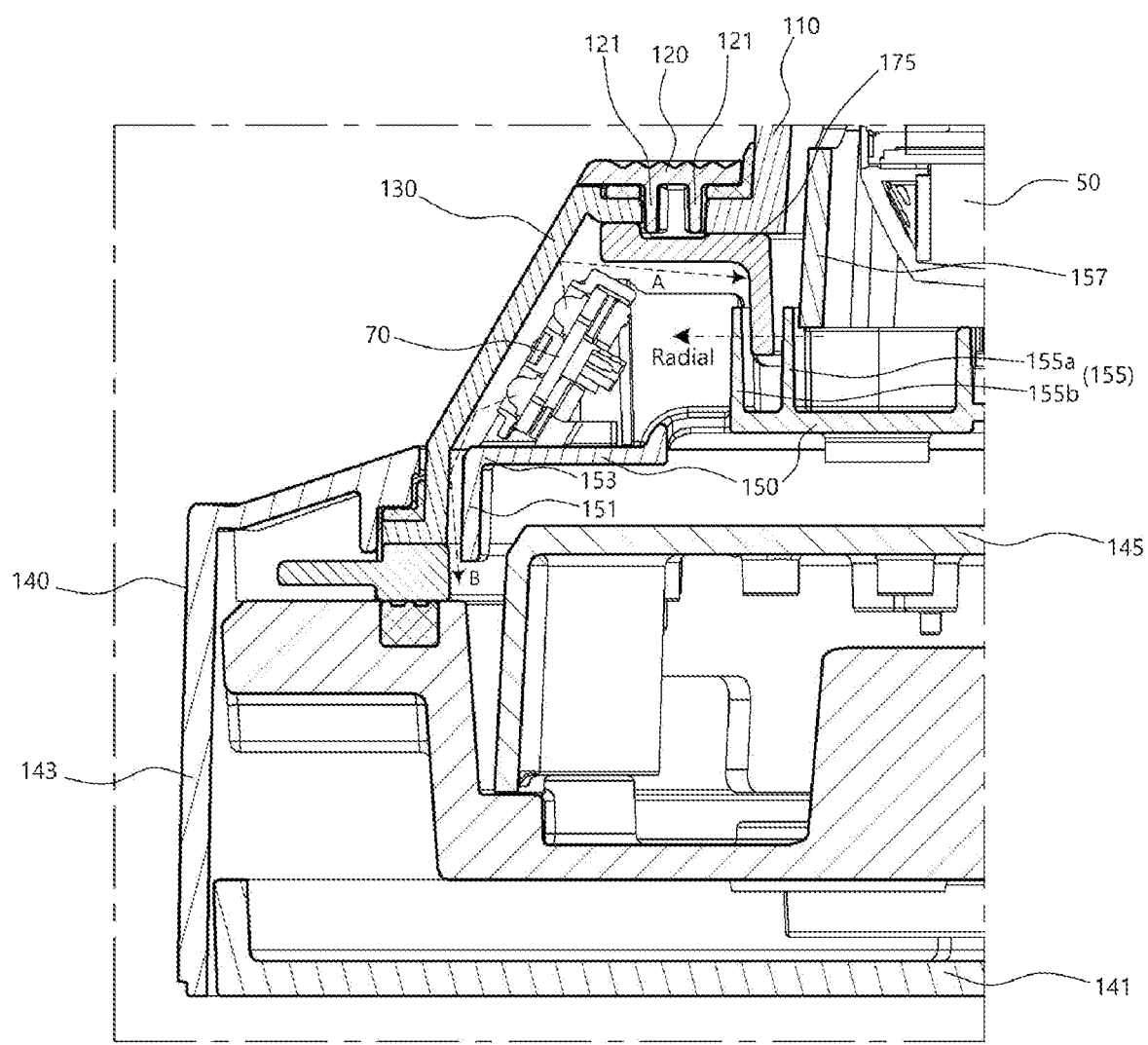
FIG. 3B is an enlarged cross-sectional view of a part of the cut perspective view in accordance with FIG. 3A.

FIG. 3A is a cut perspective view of the pan motion camera 100 of FIG. 1A in an X-X' direction, and FIG. 3B is an enlarged cross-sectional view of a part of the cut perspective view. All of the cut perspective and cross-sectional views are symmetrical with respect to the rotation axis Ax, so only one side is illustrated.

Referring to FIG. 3A, the case 140 includes a fixed stage 145 to which the rotating member 150 is coupled, a side wall 143 formed in the circumferential direction as an outer surface of the camera housing, and a lower plate 141. The fixed stage 145 may be a stationary stage that does not rotate as the rotating member 150 rotates over the fixed stage 145. The camera module 50 and the lighting module 70 are mounted on the rotating member 150. Therefore, when the rotating member 150 is rotated with respect to the rotation axis Ax on the fixed stage 145 by a motor (not illustrated), the camera module 50 and the lighting module 70 also rotate. The camera module 50 and the lighting module 70 may be aligned, fixed in relation to each other, and move together as the rotating member 150 rotates.

Referring to FIG. 3B, light emitted from the lighting module 70 may have a path A reflected upward and backward from the lighting cover 130. The light along the path A is directed toward the rotation axis Ax beyond an upper end of the lighting module 70 and therefore may flow into the camera module 50.

Embodiments described herein introduce a light blocking plate 175 that is fixed to a side of the camera housing, does not rotate with the rotating member 150, and blocks the light emitted from the lighting module 70 from flowing into a lens of the camera module 50. The light blocking plate 175 and other light blocking elements described herein may be made of suitable light blocking materials such as a variety of metals or plastics or other elements known in the art. The camera housing may refer to the light transmitting cover 110, the lighting module 70, and the case 140. The light blocking plate 175 is configured to not come into contact with the rotating member 150. This is because the light blocking plate 175 is fixed, while the rotation member 150 and parts thereon rotate, so that physical interference between the light blocking plate 175 and the rotation member 150 does not occur.

The light blocking plate 175 may be fixed to a lower portion 121 of the step 120 inside the camera housing. The light blocking plate 175 may extend horizontally (perpendicular to axis Ax) and protruding downward along a circumferential direction (at least along a portion of a circumference). The circumferential direction may refer to a direction parallel with the rotating axis Ax. The light blocking plate 175 may be in an L-shape, but embodiments are not limited thereto. Either side of the L-shape may be longer than the other or each side may be similar in length. Accordingly, the light blocking plate 175 blocks light emitted upward from the lighting module or light reflected upward from the lighting cover 130 after being emitted from the lighting module 70 from flowing into the camera module 50 along the path A or thereabouts.

As such, light directed toward an upper side of the lighting module 70 may be blocked by the light blocking plate 175 from flowing into the camera module 50. However, an additional configuration may be applied to the rotating member 150 to provide this blocking effect. For example, the rotating member 150 may include a protrusion 155 (also illustrated in FIG. 1C) projecting upward along at least a portion of the circumferential direction. The protrusion 155 is formed on the rotating member 150 so as not to contact the light blocking plate 175 such that light from the lighting module 70 does not flow into the camera module 50. In particular, the protrusion 155 is arranged to overlap the light blocking plate 175 in the rotational radial direction so that additional reliable light blocking may be achieved. Because there is no contact between the light blocking plate 175 and the protrusion 155, interference does not occur in the movement of the rotating member 150. At the same time, the overlapping arrangement between the light blocking plate 175 and protrusion 155 in the rotational radial direction additionally blocks the light from path A from flowing into a center of the camera housing.

To enhance the blocking effect and structural stability, the protrusion 155 may include a pair of upward ribs 155*a* and 155*b*. Here, the pair of upward ribs 155*a* and 155*b* may extend from the rotation member 150 in the circumferential and rotational radial direction so that the light blocking plate 175 is fitted between the pair of upward ribs 155*a* and 155*b* without contact. The upward ribs 155*a* and 155*b* may be said to fit around the light blocking plate 175.

In addition, the rotating member 150 may further include a blocking wall 157 (also illustrated in FIG. 1C) positioned between the upward ribs 155*a* and 155*b* and the camera module 50 with respect to the rotational radial direction to further block the light in the path A. The blocking wall 157 serves to block the illumination light from entering a space above the upward ribs 155*a* and 155*b*. The blocking wall 157 may block an upper light similar to the light blocking plate 175, but unlike the light block plate 175 that is fixed to wall of the camera housing, the blocking wall is formed on the rotating member 150 and rotates with the rotating member.

As illustrated in FIG. 3B, light reflected from the lighting module 70 may have another path B that reflects downwardly as well as the path A reflected upwardly and rearwardly from the lighting cover 130. The light reflected downwardly may have a relatively small effect on the camera module 50 compared to the light reflected upwardly, but there is a possibility that the light reflected downwardly may flow into the camera module 50 through circuitous routes. Therefore additional countermeasures are included.

To this end, the rotating member 150 further includes a lower bent portion 151 bent downward from an end piece 153 of the rotating member 150 in the circumferential direction. The lower bent portion 151 blocks light reflected downwardly from the lighting module 70 or light reflected downwardly from the lighting cover 130 after being emitted from the lighting module 70 from flowing into the camera module 50. Due to the presence of the lower bent portion 151, light directed downwardly from the lighting module 70 may not be directed toward the center of the camera housing as it is directed toward a lower plate 141 of the case 140.

Elements described herein that are fixed and configured to hold rotating parts of the pan motion camera may be called a fixed assembly. Elements that rotate within the fixed assembly may be called a rotating assembly 160. The rotating assembly 160 may rotate about or within the fixed assembly.

Light blocking elements described herein that are attached to the fixed assembly may be called fixed light blocking elements or members. Fixed light blocking elements may include the step 120, the light blocking plate 175, and other elements that remain fixed in the camera housing.

The fixed light blocking elements such as the step 120 and light blocking plate 175 are disposed between the lighting cover 130 and the light transmitting cover 110. The fixed light blocking elements such as the step 120 and light blocking member are also disposed between the at least one lighting modules 70 and the light transmitting cover 110.

Light blocking elements described herein that are attached to the rotating assembly 160 may be called rotation light blocking elements or members. Rotation light blocking elements may include the end piece 153 and lower bent portion 151, the protrusion 155, and the blocking wall 157, but embodiments are not limited thereto. Other features that rotate along with the rotating member 150 as well as the rotating member itself are rotation light blocking elements.

Figure 4A:
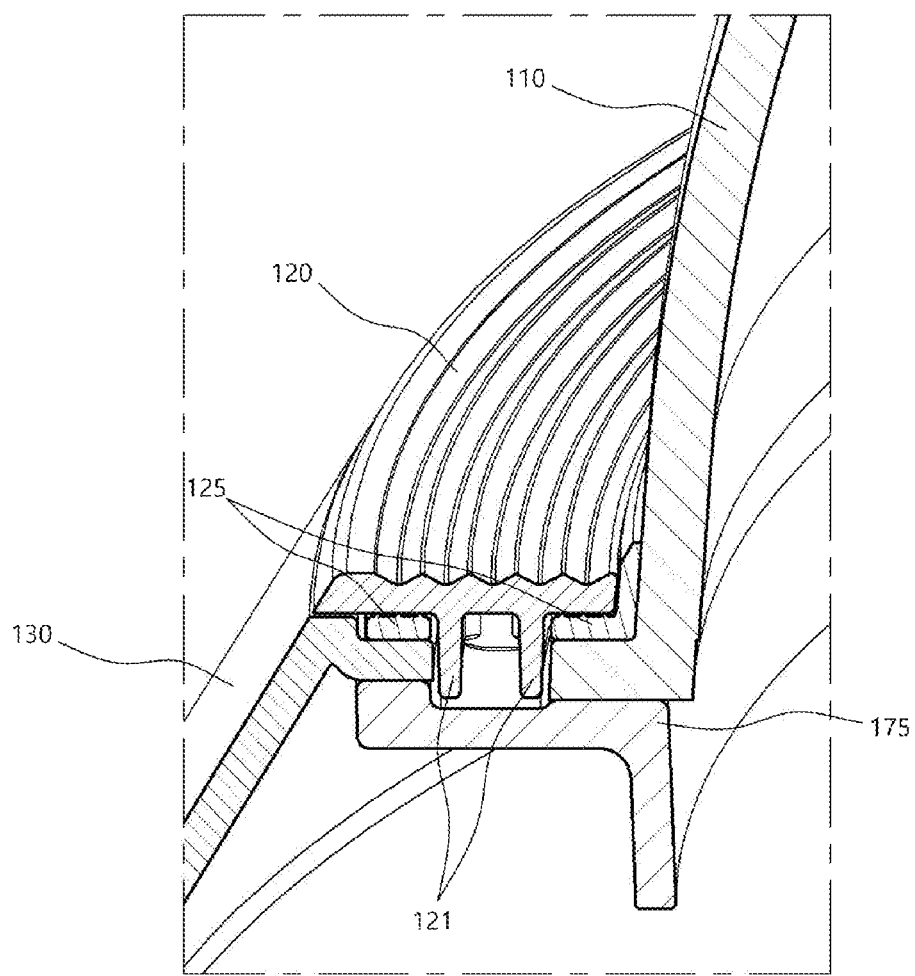
FIG. 4A is an enlarged perspective view illustrating a step formed between the light-transmitting cover and the lighting cover in accordance with FIG. 3A.
Figure 4B:
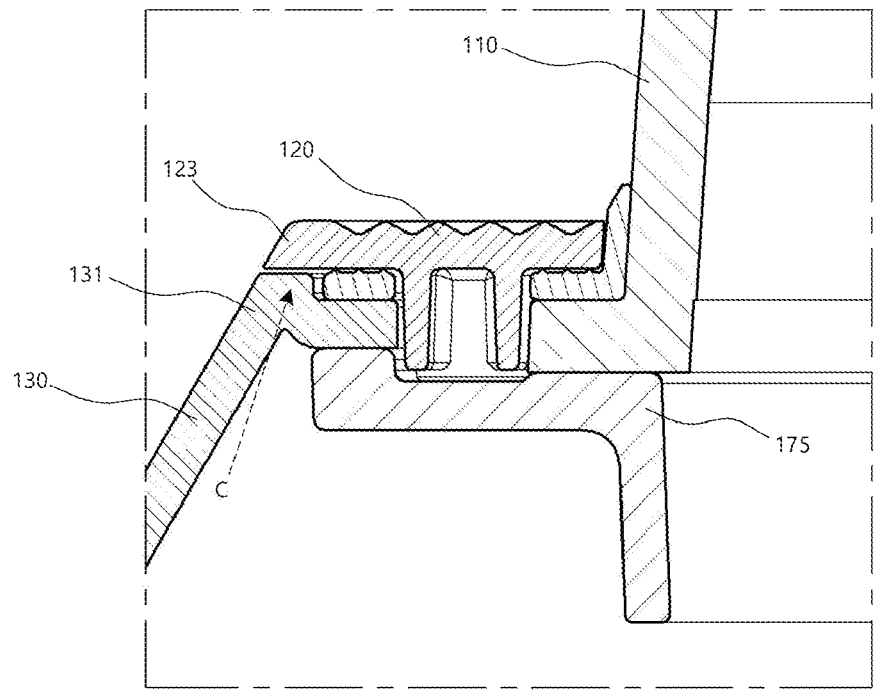
FIG. 4B is a cross-sectional view illustrating a region around the step in accordance with FIG. 4A.

FIG. 4A is an enlarged perspective view of an area around the step 120 formed between the light-transmitting cover 110 and the lighting cover 130 in FIG. 3A. FIG. 4B is a cross-sectional view of FIG. 4A. As described herein, the step 120 prevents the illumination light emitted from the lighting module 70 from flowing into the light-transmitting cover 110 from the outside of the camera housing. Therefore, the step 120 is made of a material that cannot transmit the illumination light, and also serves to fill and seal a gap between the light-transmitting cover 110 and the lighting cover 130. This is because, as illustrated in FIG. 1B, the light-transmitting cover 110 must be easily removable for the management of the pan motion camera 100. To this end, the step 120 may further include the lower portion 121 that is configured to insert a gap between the light-transmitting cover 110 and the lighting cover 130, and a seal 125 having elasticity. The elastic seal 125 may be arranged between the step 120 and the light-transmitting cover 110 and between the step 120 and the lighting cover 130 to prevent water or foreign matters from entering there between.

The step 120 may include a step end 123 disposed in the rotational radial direction. The step end 123 is configured to cover at least a portion of an upper end 131 of the lighting cover 130 so that the light emitted from the lighting module 70 or the light reflected from the lighting cover 130 is not irradiated upwardly along a path C toward the light-transmitting cover 110. On the contrary, if the upper end of the lighting cover 130 is configured to cover the end of the step 120, light directed toward the upper end of the lighting cover 130 may be emitted to the outside and the emitted light may flow into the lens of the camera module 50 through the light-transmitting cover. Accordingly, the configuration of the step 120 may further contribute to an object of the present invention to prevent the illumination light from flowing into the camera module 50.

Figure 5A:
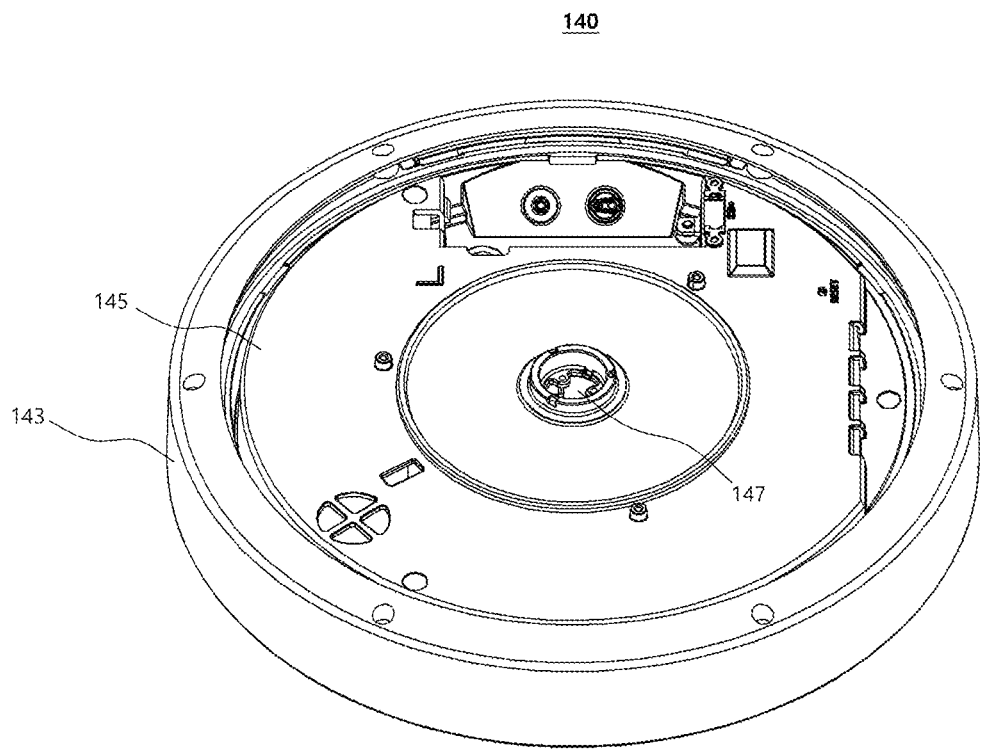
FIG. 5A is a perspective view illustrating a case in accordance with embodiments described herein.
Figure 5B:
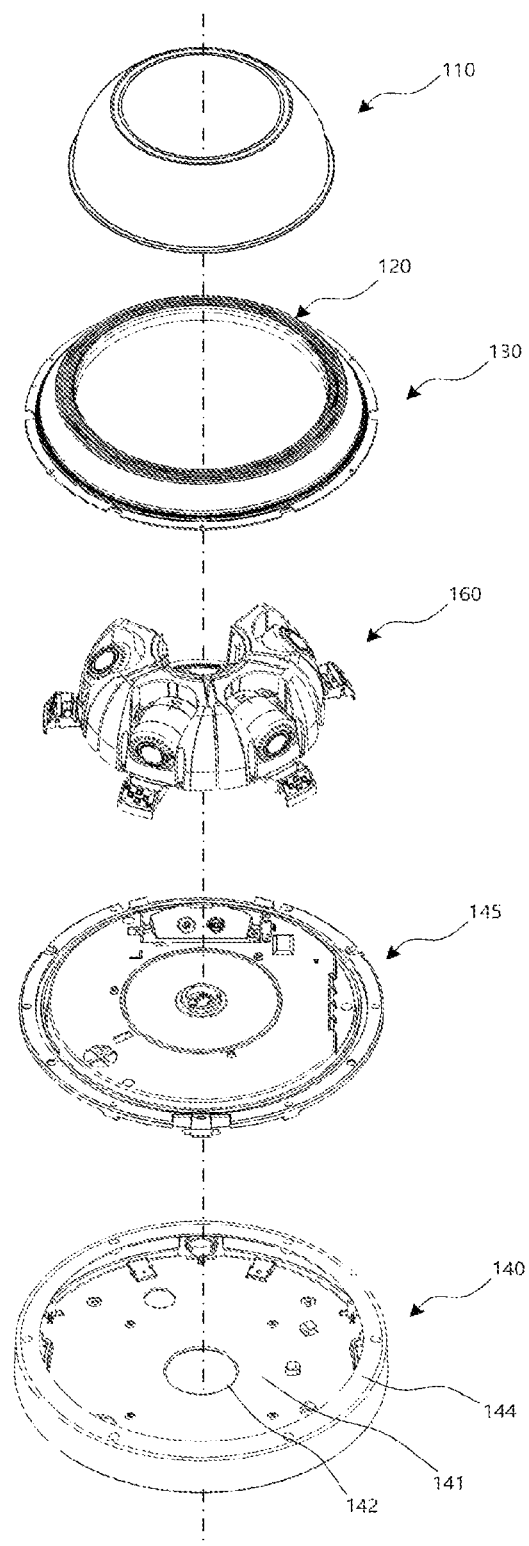
FIG. 5B is an exploded perspective view illustrating the pan motion camera in accordance with embodiments described herein.

FIG. 5A is a perspective view of the case 140, and FIG. 5B is an exploded perspective view of the pan motion camera 100. The fixed stage 145 is a structure that is rotatably supported by mounting the rotating assembly 160 as described above. Various components (not illustrated), such as a motor or a circuit board, may be arranged in a space below the fixed stage 145 of the case 140. A driving force by the motor passes through the fixed stage 145 and is transmitted to the rotating member 150 of the rotating assembly 160. Electrical connection or wiring between the camera module 50 and the lighting module 70 included in the rotating assembly 160 and the circuit board is made through a hollow 147 formed on the fixed stage 145.

Referring to FIG. 5B, the fixed stage 145 is configured to cover an inner space of the case 140. In the lower plate of the case 140, an opening 142 is formed so that wiring from the pan motion camera 100 may be connected to the outside. The rotating assembly 160 is coupled to the driving motor and is rotatably installed on the fixed stage 145. Then, the lighting cover 130 including the step 120 is assembled to an outer circumferential surface 144 of the case 140 by a fixing means. Finally, the assembly of the pan motion camera 100 may be completed by coupling the light-transmitting cover 110 to be seated within an inner peripheral surface of the step 120.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A pan motion camera having a motor to provide a rotational driving force, comprising:
    a rotating member configured to rotate around a rotation axis according to the rotational driving force;
    at least one camera module mounted on the rotating member and configured to rotate together with the rotating member;
    at least one lighting module mounted at a position corresponding to the at least one camera module on the rotating member and configured to rotate together without movement relative to the at least one camera module;
    a camera housing; and
    a light blocking member configured to block light emitted from the lighting module from flowing into a lens of the camera module without contacting the rotating member,
    wherein the light blocking member is fixed to a side of the camera housing such that the light blocking member does not rotate while the at least one camera module and the at least one the lighting module rotate together without movement relative to each other.

2. The pan motion camera of claim 1, wherein the position corresponding to the at least one camera module on which the at least one lighting module is mounted is a position lower than the camera module and outward in a rotational radial direction.

3. The pan motion camera of claim 1, wherein the at least one camera module comprises a plurality of camera modules, and wherein the at least one lighting module includes a plurality of lighting modules corresponding to the plurality of camera modules.

4. The pan motion camera of claim 2, wherein the camera housing comprises:
    a light-transmitting cover surrounding the at least one camera module in a dome shape along a circumferential direction;
    a lighting cover connected to a lower end of the light-transmitting cover and surrounding the at least one lighting module along the circumferential direction; and
    a case connected to a lower end of the lighting cover and accommodating the motor and the rotating member.

5. The pan motion camera of claim 4, further comprising:
    a step arranged in the rotational radial direction between the light-transmitting cover and the lighting cover, the step being formed of a material that does not transmit light.

6. The pan motion camera of claim 5, wherein an end of the step in the rotational radial direction covers at least a portion of an upper end of the lighting cover so that light emitted from the at least one lighting module is not irradiated upward to the light-transmitting cover side.

7. The pan motion camera of claim 4, further comprising:
    a step arranged between the light-transmitting cover and the lighting cover, wherein the light blocking member is fixed to an inner lower portion of the step, and protrudes downward along the circumferential direction, such that first light emitted upward from the lighting module or second light emitted from the lighting module and then reflected upward from the lighting cover is blocked from flowing into the at least one camera module.

8. The pan motion camera of claim 7, wherein the rotating member comprises a protrusion projecting upward along at least a portion of the circumferential direction, and wherein the protrusion is arranged to overlap the light blocking member in the rotational radial direction without contacting the light blocking member so that the first light or the second light does not flow into the at least one camera module.

9. The pan motion camera of claim 8, wherein the protrusion comprises a pair of upward ribs, and wherein the pair of upward ribs are arranged to be spaced apart in the rotational radial direction so that the light blocking member is fitted within the pair of upward ribs without contact.

10. The pan motion camera of claim 9, wherein the rotating member further comprises a blocking wall positioned between the pair of upward ribs and the at least one camera module in the rotational radial direction to further block the first light or the second light.

11. The pan motion camera of claim 7, wherein the rotating member comprises a downward bent portion bent downward from an end of the rotating member in the rotational radial direction, and wherein the downward bent portion blocks third light emitted from the lighting module or fourth light emitted from the lighting module and then reflected downward from the lighting cover from flowing into the at least one camera module.

12. A pan motion camera assembly, comprising:
    a fixed assembly configured to hold rotating parts of the pan motion camera assembly, the fixed assembly including a case, a fixed stage disposed on the case, a lighting cover disposed on the fixed stage, a light transmitting cover disposed on the lighting cover, and at least one fixed light blocking member disposed between the lighting cover and the light transmitting cover configured to block light directed towards the light transmitting cover; and
    a rotating assembly configured to rotate within the fixed assembly, the rotating assembly including a rotating member connected to a motor, at least one camera mounted on the rotating member, at least one lighting module corresponding to the at least one camera and mounted to the rotation member, and at least one rotation light blocking member connected to the rotating member and configured to block light reflected from the lighting module from reaching the at least one camera,
    wherein the rotating assembly rotates about the fixed assembly, and wherein the light blocking member is fixed to a side of a camera housing such that the light blocking member does not rotate while the at least one camera and the at least one lighting module rotate together without movement relative to each other.

13. The pan motion camera assembly of claim 12, wherein the at least one fixed light blocking member is a light blocking plate that extends in an L-shape in a direction parallel to an axis of rotation of the pan motion camera assembly and perpendicular to the axis of rotation.

14. The pan motion camera assembly of claim 12, wherein the at least one fixed light blocking member is a blocking wall positioned between a pair of upward ribs and the at least one camera in a rotational radial direction of the pan motion camera assembly.

15. The pan motion camera assembly of claim 12, wherein the at least one fixed light blocking member is a step.

16. The pan motion camera assembly of claim 15, wherein the step includes at least one leg that fixes to another fixed light blocking member.

17. The pan motion camera assembly of claim 12, wherein the at least one rotation light blocking member is a protrusion that extends from the rotation member.

18. The pan motion camera assembly of claim 17, wherein the protrusion includes a plurality of ribs that fit around a fixed light blocking portion of the fixed assembly.

19. The pan motion camera assembly of claim 12, wherein the fixed light blocking assembly and rotational light blocking assembly are configured to block light emitted from the at least one lighting module and reflected by the lighting cover.

20. The pan motion camera assembly of claim 19, wherein the fixed light blocking assembly and rotational light blocking assembly are configured to block light directed upwardly and downwardly parallel to an axis of rotation of the pan motion camera assembly.

* * * * *